(12) United States Patent
Biswal et al.

(10) Patent No.: US 9,947,323 B2
(45) Date of Patent: Apr. 17, 2018

(54) SYNTHETIC OVERSAMPLING TO ENHANCE SPEAKER IDENTIFICATION OR VERIFICATION

(71) Applicant: INTEL CORPORATION, Santa Clara, CA (US)

(72) Inventors: Narayan Biswal, Folsom, CA (US); Gokcen Cilingir, Sunnyvale, CA (US); Barnan Das, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/088,500

(22) Filed: Apr. 1, 2016

(65) Prior Publication Data

US 2017/0287489 A1    Oct. 5, 2017

(51) Int. Cl.
| G10L 15/00 | (2013.01) |
| G10L 17/06 | (2013.01) |
| G10L 17/02 | (2013.01) |
| G10L 17/04 | (2013.01) |
| G10L 17/24 | (2013.01) |

(52) U.S. Cl.
CPC .............. *G10L 17/06* (2013.01); *G10L 17/02* (2013.01); *G10L 17/04* (2013.01); *G10L 17/24* (2013.01)

(58) Field of Classification Search
None
See application file for complete search history.

(56) References Cited

U.S. PATENT DOCUMENTS

| 6,389,397 | B1 * | 5/2002 | Otto | G10L 17/24 704/270 |
| 2003/0063759 | A1 * | 4/2003 | Brennan | H04R 3/005 381/92 |
| 2009/0089635 | A1 * | 4/2009 | Chen | G01R 31/046 714/727 |
| 2012/0214544 | A1 * | 8/2012 | Shivappa | H04M 1/72572 455/556.1 |
| 2012/0269332 | A1 * | 10/2012 | Mukund | H04S 3/006 379/201.06 |
| 2012/0281859 | A1 * | 11/2012 | Villemoes | G10L 21/038 381/98 |
| 2014/0199981 | A1 * | 7/2014 | Caley | H04W 4/001 455/418 |
| 2015/0073795 | A1 * | 3/2015 | Tan | G10L 15/063 704/243 |
| 2015/0348562 | A1 * | 12/2015 | Krishnaswamy | G10L 21/0264 704/206 |
| 2017/0076720 | A1 * | 3/2017 | Gopalan | G06F 3/167 |

FOREIGN PATENT DOCUMENTS

CA    2594362 C  * 12/2009 .............. H04R 3/005

* cited by examiner

*Primary Examiner* — Marcus T Riley
(74) *Attorney, Agent, or Firm* — International IP Law Group, P.L.L.C.

(57) ABSTRACT

An apparatus for oversampling audio signals is described herein. The apparatus includes one or more microphones to receive audio signals and an extractor to extract a set of feature points from the audio signals. The apparatus also includes a processing unit to determine a distance between each pair of feature points and an oversampling unit to generate a plurality of new feature points based the distance between each pair of feature points.

23 Claims, 6 Drawing Sheets

SYNTHETIC OVERSAMPLING TO ENHANCE SPEAKER IDENTIFICATION OR VERIFICATION

BACKGROUND ART

Biometric authentication is an authentication technique that relies on the characteristics of humans to enable access to secured areas or locations. Biometric identifiers include, but are not limited to fingerprints, face recognition, iris recognition, odor/scent, and voice. In a voice biometric system (VBS), a user can register his/her voice by providing a voice sample which is analyzed to create a unique voice print. A user can then make phrase dependent or independent utterances which can be used to identify the particular user.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
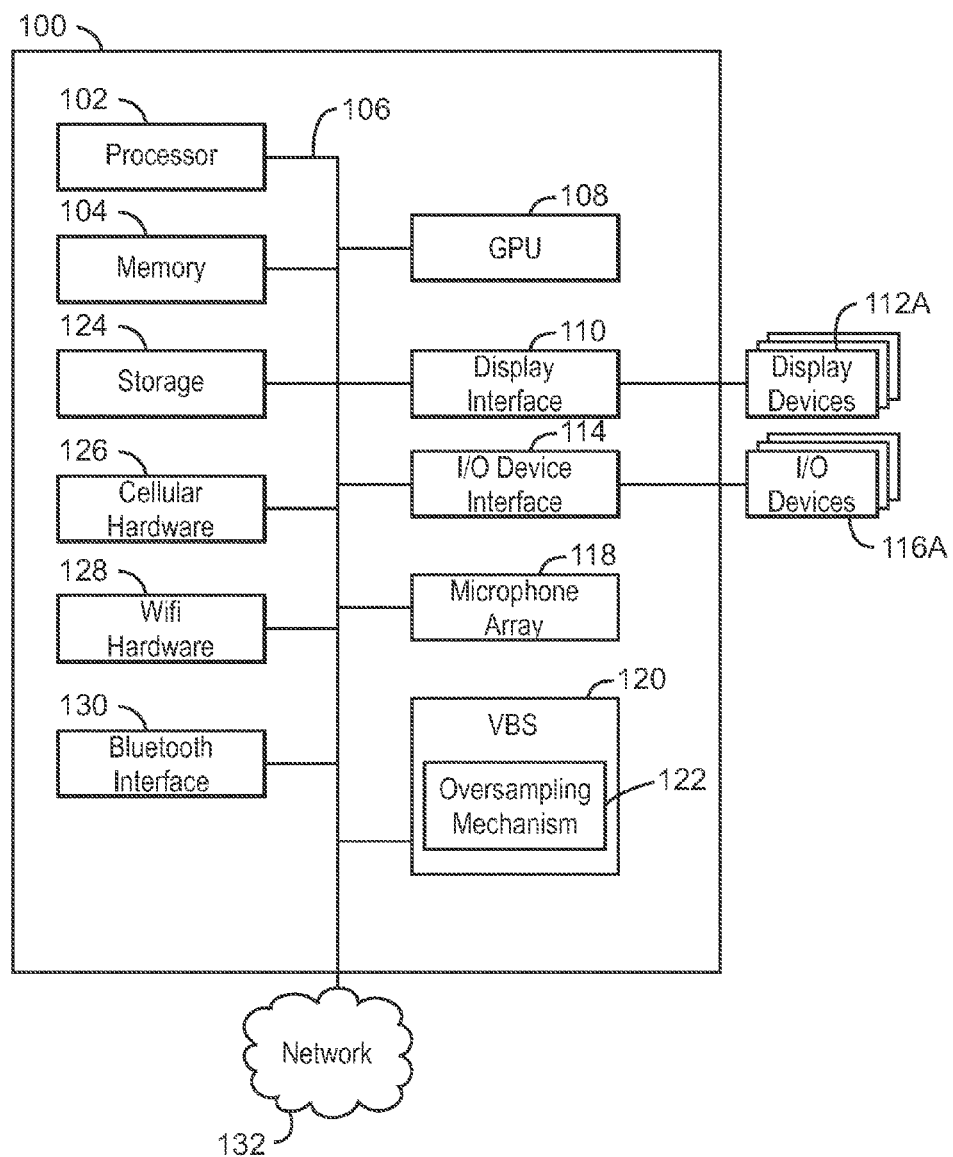
FIG. 1 is a block diagram of an electronic device that enables synthetic oversampling to enhance speaker identification or verification.

Phrase-independent speaker identification can require the capture of a significantly large amount of voice audio data to provide acceptable accuracy in order to generate a voice print used in a VBS. In some cases, the voice audio data required is at least 5-10 minutes of audio data. Embodiments described herein propose a phrase-independent speaker identification solution that achieves high accuracy with less training data (at least 20% less). Each of the enrollment and authentication utterances can be oversampled in order to accurately identify a user with less data than is required with conventional VBS techniques. Phrase dependent speaker identification is also supported.

Embodiments described herein perform synthetic oversampling to enhance speaker identification or verification. In embodiments, the present techniques enable an increase in an information extraction efficiency from utterances. As used herein, information extraction efficiency refers to a rate at which valid data is extracted from utterances. Most of the commercial solutions require a large amount of voice data from the user during enrollment and authentication. However, this has a negative impact on the practical usability of such solution and creates an unpleasant user experience. The present techniques enable a shorter time to collect training data during user enrollment and a shorter time to collect voice data during verification and/or authentication. The present techniques also eliminate high false rejection and false acceptance rates when using smaller training data.

Additionally, the present techniques enable phrase-dependent speaker identification. In phrase dependent speaker identification, the enrollment time may be approximately 10-30 seconds, and less than a phrase independent implementation. As used herein, enrollment time refers to a predefined length of time of an utterance. Phrase dependent speaker identification may result in a higher identification accuracy when oversampling is applied as compared to phrase independent speaker identification. A benefit to using phrase dependent speaker identification according to the present techniques is higher accuracy may be achieved using same amount of data due to added variance to enrollment and authentication utterances.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an electronic device that enables synthetic oversampling to enhance speaker identification or verification. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to a display device 112. The display device 112 can include a display screen that is a built-in component of the electronic device 100. The display device 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

The electronic device 100 also includes a microphone array 118 for capturing audio. The microphone array 118 can include any number of microphones. In some embodiments, the microphone array 118 can be used together with a voice biometric system (VBS) 120. The VBS 120 is to increase the information extraction efficiency from enrollment and authentication utterances. In embodiments, the VBS 120 extracts feature points from a given utterance that are used to differentiate speakers. The VBS 120 uses an oversampling mechanism 122 to increase and enhance the set of feature points extracted from a user's utterance by synthetically adding new feature points to the captured utterance.

The oversampling mechanism 122 according to the VBS 120 defines a way to extrapolate new feature points from a given set of existing feature points extracted from an utterance. In embodiments, a mechanism can filter out extrapolated feature points that are irrelevant using voice activity detection (VAD) techniques. Oversampling according to the present techniques may be used as preprocessing step with any VBS system regardless of the internal voice biometric algorithms used by the VBS system. In embodiments, a feature point is irrelevant if the feature point does not represent a valid voice sample or utterance. For example, a racing car's noise is just "noise", it is not a valid voice sample that can be used for speaker identification or verification.

The electronic device may also include a storage device 124. The storage device 124 is a physical memory such as a hard drive, an optical drive, a flash drive, an array of drives, or any combinations thereof. The storage device 124 can store user data, such as audio files, video files, audio/video files, and picture files, among others. The storage device 124 can also store programming code such as device drivers, software applications, operating systems, and the like. The programming code stored to the storage device 124 may be executed by the CPU 102, GPU 108, or any other processors that may be included in the electronic device 100.

The CPU 102 may be linked through the bus 106 to cellular hardware 126. The cellular hardware 126 may be any cellular technology, for example, the 4G standard (International Mobile Telecommunications-Advanced (IMT-Advanced) Standard promulgated by the International Telecommunications Union-Radio communication Sector (ITU-R)). In this manner, the PC 100 may access any network 126 without being tethered or paired to another device, where the network 132 is a cellular network.

The CPU 102 may also be linked through the bus 106 to WiFi hardware 128. The WiFi hardware is hardware according to WiFi standards (standards promulgated as Institute of Electrical and Electronics Engineers' (IEEE) 802.11 standards). The WiFi hardware 128 enables the electronic device 100 to connect to the Internet using the Transmission Control Protocol and the Internet Protocol (TCP/IP), where the network 132 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 130 may be coupled to the CPU 102 through the bus 106. The Bluetooth Interface 130 is an interface according to Bluetooth networks (based on the Bluetooth standard promulgated by the Bluetooth Special Interest Group). The Bluetooth Interface 130 enables the electronic device 100 to be paired with other Bluetooth enabled devices through a personal area network (PAN). Accordingly, the network 132 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Voice authentication using a VBS as described herein begins with a user providing voice samples containing utterances to the VBS that are captured via a microphone. The voice samples as captured by the microphone are training data. The training data may be used to train the VBS to recognize the user by the user's voice, independent of any particular phase or word, often referred as "key phrase" or "key word". Accordingly, in phrase independent usage, user can be detected independent of what words are uttered, as no particular phrase or word is needed. The present techniques may also apply to a phrase-dependent usage, where the user is expected to utter a known phrase or word. In embodiments, the training data is to generate a voice print for each user. Once the VBS has an adequate sample of training data, the VBS can recognize the user based on the characteristics of the user's voice, including but not limited to pitch, tone, and accent.

Figure 2:
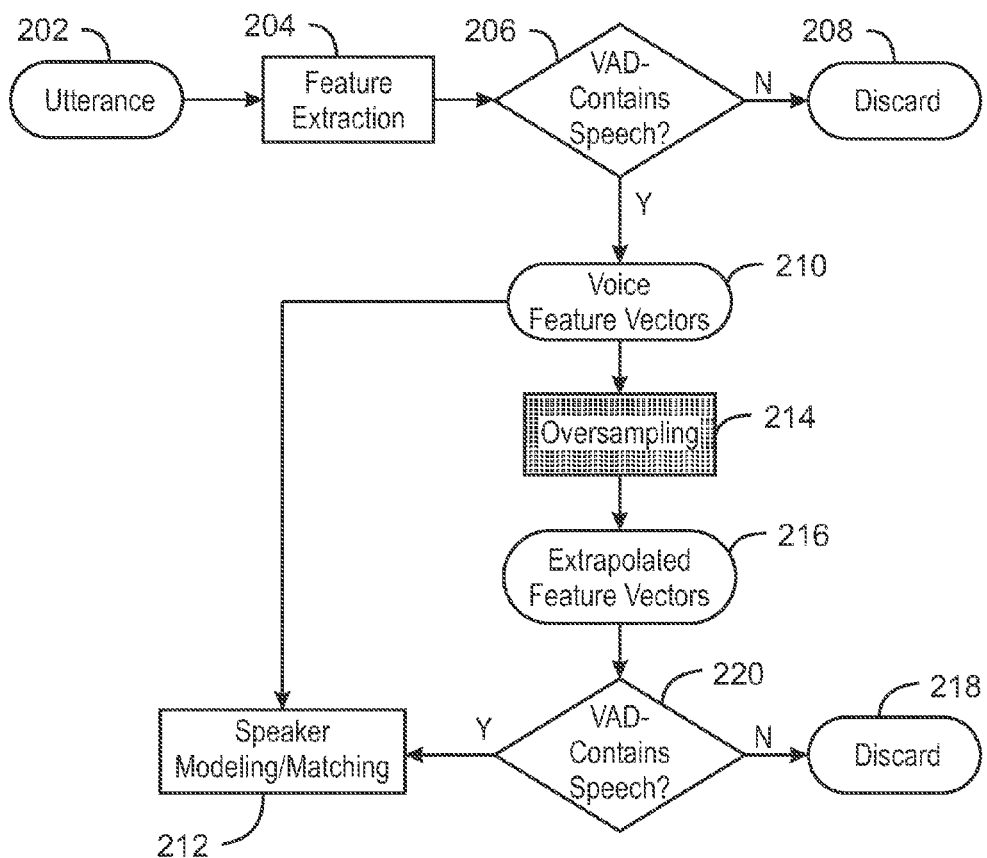
FIG. 2 is a voice biometric system pipeline.

FIG. 2 is a voice biometric system pipeline 200. An utterance 202 is captured sent to a feature extraction block 204. The feature extraction block 204 is to extract features from the captured voice data. A feature, as used herein, may refer to an individual measurable property of a phenomenon being observed. In embodiments, a feature is an informative and discriminating element of the voice data that can be used to identify and verify speakers. A VBS transforms the given utterance to a number of feature points. During enrollment, these feature points are used to train a speaker model. During login/authentication, these points are used to form recognition decisions. As used herein, recognition decisions are determinations made based on human speech that the human speaking is recognized as the person he or she is purporting to be. Utterance length is directly proportional to the number of feature points extracted from the utterance.

At block 206, a voice activity detection unit analyzes the voice data and the extracted features to determine if the voice data contains speech. In embodiments, block 206 represents a VAD filtering unit that is applied to the extracted features to determine the portion of generated feature vectors that are useful depending on their speech content. If the voice data does not contain speech, the voice data is discarded at block 208. If the voice data does contain speech, process flow continues to block 210.

At block 210, voiced feature vectors are obtained from the speech. The voiced feature vectors are n-dimensional vectors of the features that represent the voice data. The voiced feature vectors may be sent to each of a speaker modeling/matching block 212 and an oversampling block 214. In embodiments, the oversampling block is placed right after the VAD block to make sure only relevant feature vectors are used for extrapolation. Relevant features vectors in this context may be feature vectors that belong to human speech. The VAD or voice activity detection is a preprocessing module that determines if a feature vector is a human speech. VAD "filtering" is the process of applying VAD on feature vectors.

The oversampling block 214 is to generate new feature points using the voiced feature vectors to increase the information extraction efficiency from login and enrollment utterances. The oversampling block is further described in FIG. 3. After oversampling, additional feature vectors are extrapolated from the additional feature points at block 216.

The feature vectors, including the new extrapolated feature vectors are processed by a VAD filter at block 220. Extrapolation of existing feature points can sometimes create new feature points that may not be an accurate representation of human speech. This is a result of the degree of randomness involved with extrapolation. A second VAD filter is therefore necessary to ensure that extrapolated feature points that do not represent human speech are not used to train the speaker model. The VAD filtering block 220 analyzes all feature vectors to ensure the feature vectors are valid. For each feature vector, if the feature vector is not an accurate representation of human speech, the feature vector is discarded at block 218. If the feature vector is an accurate representation of human speech, process flow continues to block 212. In this manner, if the newly generated feature points corrupts or otherwise damages the voice data, the data is discarded to prevent errors in the VBS 200.

At block 212, the feature points extracted from the utterance at block 210, as well as the extrapolated feature vectors from block 220 are used to either create speaker voice models or to make a recognition decision. In embodiments, the present techniques use oversampling to use shorter utterances than a VBS system without oversampling to achieve the same performance as that of a VBS system without oversampling or to perform better in terms of prediction accuracy using the same length utterance.

Figure 3:
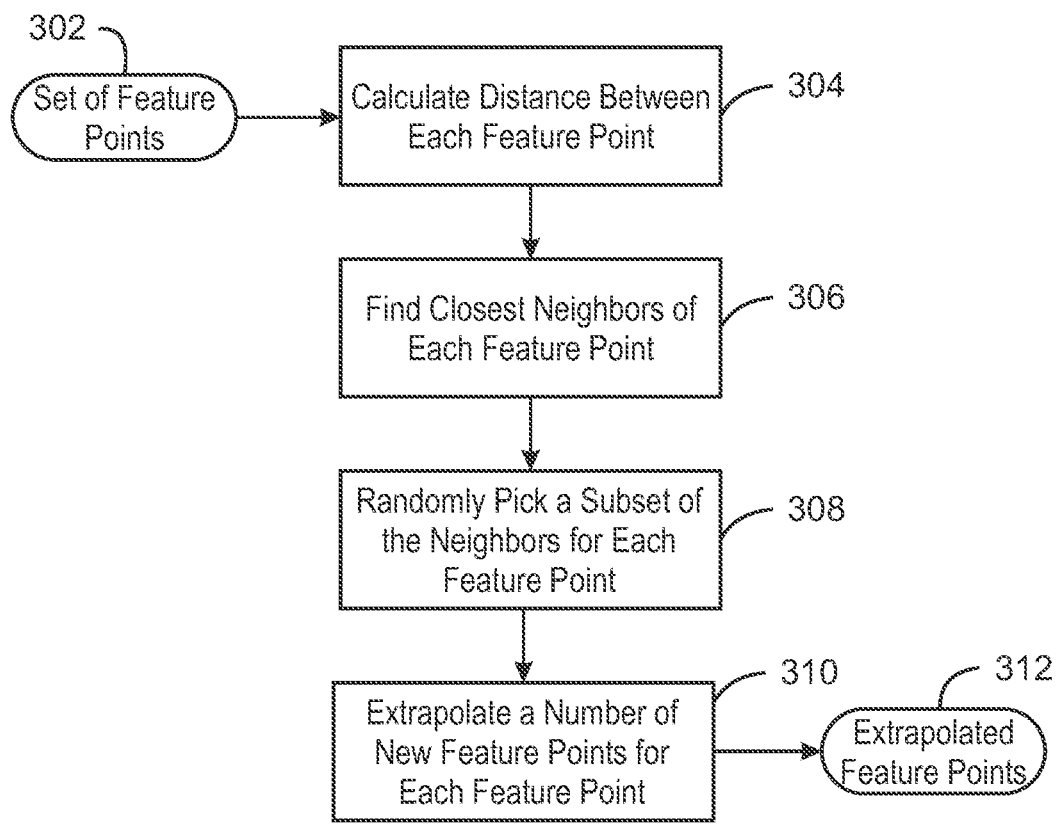
FIG. 3 is a process flow diagram of a method for oversampling.

FIG. 3 is a process flow diagram of a method 300 for oversampling. In embodiments, the oversampling in the method 300 is performed at block 214 of FIG. 2. At block 302, a set of feature points is obtained. The feature points may be for enrollment or registration purposes, or for authentication purposes. The feature points may be transformed into feature vectors, where the feature vector is an n-dimensional vector of numerical features that represent the voice data. A feature space may be the vector space associated with the feature vectors. In embodiments, the set of feature points may be Mel-frequency cepstral coefficients (MFCC). In addition to twelve MFCC features, the first and second derivatives of the MFCC features, called delta and delta-delta features, may be used. Other popular feature sets that may be used include, but are not limited to, linear predictive cepstral coefficients (LPCCs), line spectral frequencies (LSFs), and perceptual linear prediction (PLP) coefficients.

Moreover, the set of features may include any of short-term spectral features, voice source features, spectro-temporal features, prosodic features and high-level features. Short-term spectral features may be computed from short frames of about 20-30 milliseconds in duration. They are usually descriptors of the short-term spectral envelope which is an acoustic correlate of timbre, as well as the resonance properties of the supralaryngeal vocal tract. The voice source features characterize the voice source (glottal flow). Prosodic and spectro-temporal features span over tens or hundreds of milliseconds, including intonation and rhythm. High-level features capture conversation-level characteristics of speakers, such as characteristic use of words ("uh-huh", "you know", "oh yeah", etc.)

At block 304, the distance between each feature point is determined. In an n-dimensional feature space, one can define the distance between two feature points using a distance metric, such as the Euclidean distance. At block 306, the closest neighbors of each feature point is determined. In embodiments, a proximity search, similarity search, or a closest point search is performed to obtain the neighbors of each feature point. The closeness between points may be expressed in terms of a dissimilarity function. At block 308, a subset of neighbors for each feature point is randomly selected.

At block 310, a number of new feature points are extrapolated for each feature point. The extrapolated feature points may be based on the subset of neighbors for each feature point. Given a collection of feature points, two points that are close to each other can be identified and used to extrapolate a third feature point on the line segment bounded by these two sample points. Here, candidate feature points for extrapolation are determined solely by their proximity in the feature space and no assumption is made regarding their temporal ordering. Applying this extrapolation principle for each feature point once will result in doubling the size of the feature vector set. At block 312 the extrapolated feature points can be used for further processing, such as enrollment or registration purposes, or for authentication purposes.

Figure 4:
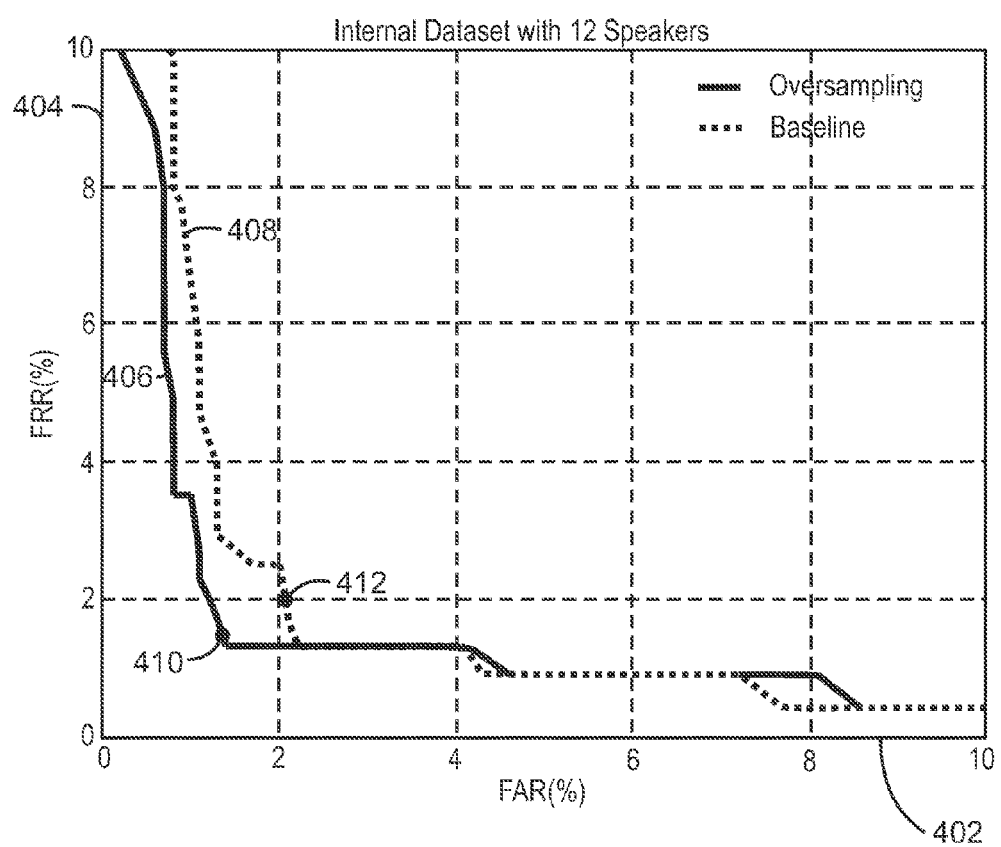
FIG. 4 is a line graph that compares a traditional VBS with a VBS with oversampling.

FIG. 4 is a line graph 400 that compares a traditional VBS with a VBS with oversampling. The x-axis 402 represents the false acceptance rate (FAR). The FAR is a percentage of invalid feature points incorrectly authenticated as valid user input. The y-axis 404 represents the false rejection rate (FRR). The FRR is the percentage of valid users whose feature vectors are incorrectly rejected.

The line 406 represents the detection error tradeoff (DET) curve of a VBS with oversampling. The line 408 represents the DET curve of a traditional VBS without oversampling. A dataset created from 12 speakers was used for the evaluation of the VBS. Evaluation involves calculating several performance metrics such as the false acceptance and rejection rates (FAR and FRR, respectively). The DET curve plots FARs and FRRs over different threshold values, and is used to visualize the performance of a VBS. The closer the DET curve is to the origin of FAR-FRR space, the better is the performance of the VBS. FIG. 4 shows two DET curves 406 and 408 corresponding to the performance estimates of two VBSs.

Both VBSs use identical feature extraction, VAD and speaker modeling/matching routines. The DET curve 406 corresponds to a VBS including the oversampling technique according to the present techniques, while the VBS corresponding to the DET curve 408 does not. As illustrated the DET curve 406 performs better than the DET curve 408. An equal error rate (EER) is often used to summarize a DET curve, which is the point of the curve where FAR and FRR are equal. Accordingly, the DET curve 406 has an EER point 410. The DET curve 408 has an EER point 412. The EER point 410 represents achieves a 30% better EER compared to the EER point 412. In embodiments, oversampling can achieve the same performance as VBS without oversampling with 20% less training data.

Figure 5:
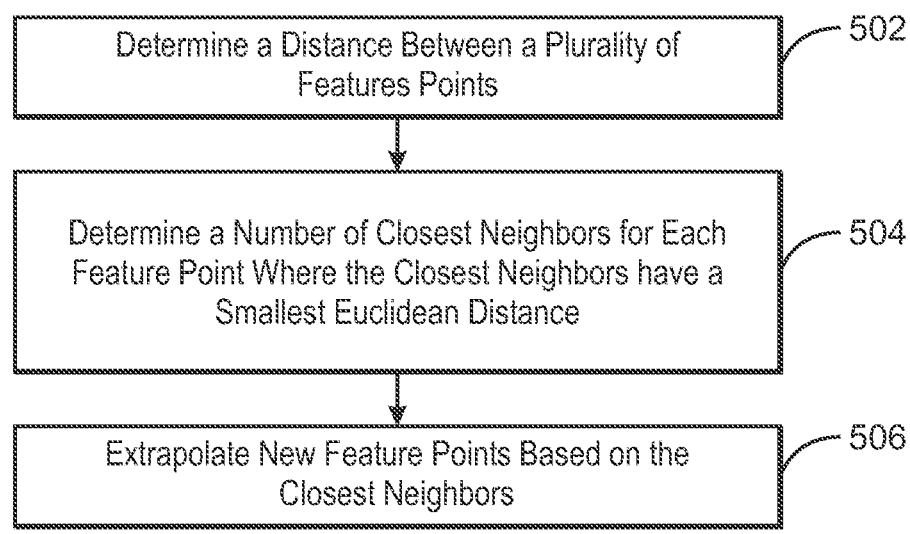
FIG. 5 is a process flow diagram of a method for enabling synthetic oversampling to enhance speaker identification or verification.

FIG. 5 is a process flow diagram of a method for enabling synthetic oversampling to enhance speaker identification or verification. At block 502, a distance between a plurality of feature points is determined. At block 504, a number of closest neighbors is determined for each feature point. In embodiments, the closest neighbors are the neighbors with the smallest Euclidean distance. At block 605, new feature points are extrapolated based on the closest neighbors.

Table 1 below is a portion of pseudocode that describes oversampling according to the present techniques. As input to the oversampling technique, a number of seed sample points S may be used. The seed sample points may be obtained from by analyzing speech from a user as captured by a microphone. The seed sample points can be structured as a two dimensional matrix of size N×M, where M represents number of features in the feature vector. Each row of the matrix represents a feature vector. An oversampling constant P can indicate the number of synthetic sample points to be extracted, while the number of nearest neighbors NN indicates the number of nearest neighbors for each sample point.

TABLE 1

```
Input: Seed sample points S (2D matrix of size N×M); Oversampling
constant Number of nearest neighbors NN
Output: Interpolated sample points T (2D matrix of size N*(P−1)×M)
Assert (P > 1 and P < N)
Assert (NN < N)
Assert (N*(P−1) < NN)
Tc = N*(P−1)
D = N×N matrix for distance calculation, initialized with INF
SI = N×NN matrix for smallest distanced sample indexes
for each i from 0 to N−1:
    for each j from 0 to N−1:
        # Populate lower half of D
        if (i < j):
            D[i][j] = EuclideanDistance(S[i],S[j])
for each i from 0 to N−1:
    for each j from 0 to N−1:
        # Populate reciprocal distances in D
        if (i > j):
            D[i][j] = D[j][i]
for each i from 0 to N−1:
    # Find indexes of smallest NN elements in each row of D
    for each k from 0 to NN −1:
        SI[i][k] = KthSmallestIndex(D[i], k)
for each i from 0 to N−1:
    # Interpolate Tc new samples for each sample in D
    # by selecting a random sample among NN closest ones
    for each k from 0 to Tc −1:
        r = random number between 0 and NN−1
        index = SI[i][r]
        for each j from 0 to M−1:
            # Each attribute of a sample is distorted individually
            diff = S[i][j] − S[index][j]
            distortion = random number between 0 and 1
            T[k][j] = S[i][j] + diff* distortion
```

In the pseudocode above, S represents seed sample points that are the original set of sample points. As each sample point is M-dimensional, and there are N number of sample points, this set can be represented as N×M matrix. The interpolated sample points T represents the set of interpolated sample points, and are assumed to be merged with S to achieve the final set of sample points (that will be used to create a speaker model). The size of set T can be found as N*Tc, where Tc is the number of interpolated sample points per each seed point. An oversampling constant P determines how many additional sample points will be generated by the algorithm. The number of final sample points will be P times the original number of sample points (P*N). By this math, number of interpolated sample points will be (P−1)*N or Tc*N as the constant Tc is set to P−1. The number of nearest neighbors NN is found for each sample point. According to the algorithm, for each sample point, NN number of nearest neighbors will be found. Among the nearest neighbors NN, only a portion will be selected to be used in interpolated sample point calculation. The distance matrix D is an intermediate matrix to hold distance calculations between original sample points. All to all distance calculation is required, resulting in the size of D being N×N. The nearest neighbor index matrix SI is an intermediate matrix to hold the indexes of sample points that are nearest to each original sample point. Since NN nearest neighbors are spotted, size of this matrix is N×NN.

For each vector of the seed sample points S in the N×M matrix, the Euclidean Distance to each nearest neighbor NN is found. The reciprocal distance of the Euclidean Distance to each nearest neighbor NN is also found for the seed sample points S in the N×M matrix. In embodiments, the reciprocal distance is calculated for efficiency purposes. In this manner, only the upper or lower half of the distance matrix (under or over the diagonal) is calculated as the distance matrix is by definition symmetric. In other words D[i][j]=D[j][i]. The smallest nearest neighbor elements NN in the matrix D for each of the seed sample points S are found and placed in matrix SI, an N×NN matrix for the smallest distanced sample indexes. New samples, Tc, are interpolated for each sample in the distance matrix D by selecting a random sample among the NN closest samples. Each attribute of a sample is distorted individually in order to add variance to the extrapolation procedure.

Figure 6:
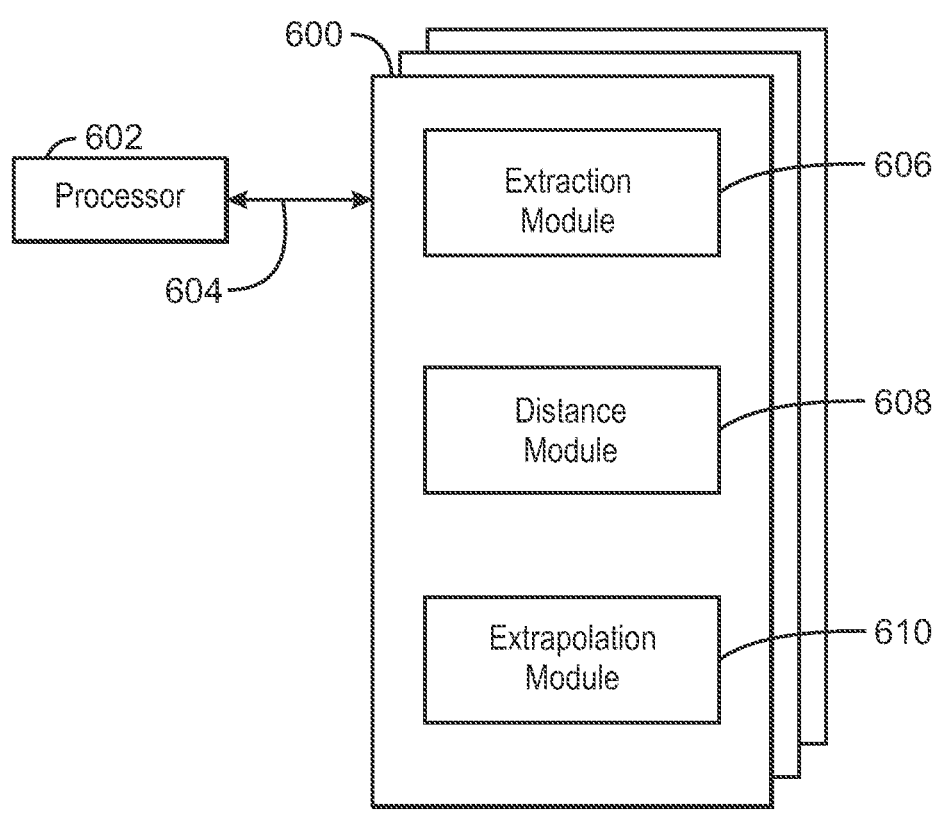
FIG. 6 is a block diagram showing a medium that contains logic for enabling synthetic oversampling to enhance speaker identification or verification.

FIG. 6 is a block diagram showing a medium 600 that contains logic for enabling synthetic oversampling to enhance speaker identification or verification. The medium 600 may be a computer-readable medium, including a non-transitory medium that stores code that can be accessed by a processor 602 over a computer bus 604. For example, the computer-readable medium 600 can be volatile or non-volatile data storage device. The medium 600 can also be a logic unit, such as an Application Specific Integrated Circuit (ASIC), a Field Programmable Gate Array (FPGA), or an arrangement of logic gates implemented in one or more integrated circuits, for example.

The medium 600 may include modules 606-610 configured to perform the techniques described herein. For example, an extraction module 606 may be configured to extract a set of feature points from digitized speech. A distance module 608 may be configured to determine distance between each pair of feature points. An extrapolation module 610 may be configured to extrapolate additional feature points based on each pair of feature points. In some embodiments, the modules 606-610 may be modules of computer code configured to direct the operations of the processor 602.

The block diagram of FIG. 6 is not intended to indicate that the medium 600 is to include all of the components shown in FIG. 6. Further, the medium 600 may include any number of additional components not shown in FIG. 6, depending on the details of the specific implementation.

Example 1 is an apparatus, for oversampling audio signals. The apparatus includes one or more microphones to receive audio signals; an extractor to extract a set of feature points from the audio signals; a processing unit to determine a distance between each pair of feature points; and an oversampling unit to generate a plurality of new feature points based the distance between each pair of feature points.

Example 2 includes the apparatus of example 1, including or excluding optional features. In this example, a plurality of feature vectors are created using the set of feature points and the new feature points. Optionally, the plurality of feature vectors are determined to be valid according to voice activity detection.

Example 3 includes the apparatus of any one of examples 1 to 2, including or excluding optional features. In this example, the generation of a plurality of new feature points generates new feature points that number at least 50% of the a number of feature points in the set of feature points.

Example 4 includes the apparatus of any one of examples 1 to 3, including or excluding optional features. In this example, the distance between the feature points is a Euclidean distance.

Example 5 includes the apparatus of any one of examples 1 to 4, including or excluding optional features. In this example, the oversampling unit is to generate a plurality of new feature points based the distance between each pair of feature points, wherein each pair of feature points are valid feature points according to voice activity detection.

Example 6 includes the apparatus of any one of examples 1 to 5, including or excluding optional features. In this example, the oversampling is a pre-processing function of a voice biometric system.

Example 7 includes the apparatus of any one of examples 1 to 6, including or excluding optional features. In this example, a speaker voice model is based on the set of feature points and the new feature points.

Example 8 includes the apparatus of any one of examples 1 to 7, including or excluding optional features. In this example, an authentication decision is based on the set of feature points and the new feature points.

Example 9 includes the apparatus of any one of examples 1 to 8, including or excluding optional features. In this example, the oversampling results in low false rejection and false acceptance rates.

Example 10 includes the apparatus of any one of examples 1 to 9, including or excluding optional features. In this example, an utterance length for audio signal capture is directly proportional to the set of feature points plus the new feature points.

Example 11 is a method for oversampling audio signals. The method includes capturing audio signals from an utterance; extracting a set of feature points from the audio signals; determining a distance between each pair of feature points; and generating a plurality of new feature points based on the distance between each pair of feature points of the set of feature points.

Example 12 includes the method of example 11, including or excluding optional features. In this example, the utterance is a phrase independent utterance.

Example 13 includes the method of any one of examples 11 to 12, including or excluding optional features. In this example, the utterance is a phrase dependent utterance.

Example 14 includes the method of any one of examples 11 to 13, including or excluding optional features. In this example, the set of feature points and the new feature points are used to train a speaker model.

Example 15 includes the method of any one of examples 11 to 14, including or excluding optional features. In this example, the set of feature points and the new feature points are used to for recognition decisions.

Example 16 includes the method of any one of examples 11 to 15, including or excluding optional features. In this example, an utterance length for audio signal capture is directly proportional to the set of feature points plus the new feature points.

Example 17 includes the method of any one of examples 11 to 16, including or excluding optional features. In this example, the feature points are Mel-frequency cepstral coefficients (MFCC).

Example 18 includes the method of any one of examples 11 to 17, including or excluding optional features. In this example, the feature points used for extrapolation are determined by a proximity search, similarity search, a closest point search, or any combination thereof.

Example 19 includes the method of any one of examples 11 to 18, including or excluding optional features. In this example, the generation of the plurality of new feature points is based the distance between each pair of feature points, wherein each pair of feature points are valid feature points according to voice activity detection Example 20 includes the method of any one of examples 11 to 19, including or excluding optional features. In this example, the oversampling results in low false rejection and false acceptance rates.

Example 21 is a system for oversampling audio signals. The system includes a microphone; a memory that is to store instructions and that is communicatively coupled to the microphone; and a processor communicatively coupled to the microphone and the memory, wherein when the processor is to execute the instructions, the processor is to: receive audio signals from an utterance; extract a set of feature points from the audio signals; determine a distance between each pair of feature points; generating a plurality of new feature points based on the distance between each pair of feature points of the set of feature points; and extrapolate feature vectors based on the plurality of new feature points and the set of feature points.

Example 22 includes the system of example 21, including or excluding optional features. In this example, the processor is to build a speaker voice model based on the feature vectors.

Example 23 includes the system of any one of examples 21 to 22, including or excluding optional features. In this example, the feature points are Mel-frequency cepstral coefficients (MFCC), linear predictive cepstral coefficients (LP-CCs), line spectral frequencies (LSFs), and perceptual linear prediction (PLP) coefficients, or any combination thereof.

Example 24 includes the system of any one of examples 21 to 23, including or excluding optional features. In this example, the plurality of feature vectors are determined to be valid according to voice activity detection.

Example 25 includes the system of any one of examples 21 to 24, including or excluding optional features. In this example, the generation of a plurality of new feature points generates new feature points that number at least 50% of the a number of feature points in the set of feature points.

Example 26 includes the system of any one of examples 21 to 25, including or excluding optional features. In this example, the distance between the feature points is a Euclidean distance.

Example 27 includes the system of any one of examples 21 to 26, including or excluding optional features. In this example, each pair of feature points are determined to be valid feature points according to voice activity detection.

Example 28 includes the system of any one of examples 21 to 27, including or excluding optional features. In this example, oversampling audio signals is a pre-processing function of a voice biometric system.

Example 29 includes the system of any one of examples 21 to 28, including or excluding optional features. In this example, an authentication decision is based on the feature vectors.

Example 30 includes the system of any one of examples 21 to 29, including or excluding optional features. In this example, the oversampling audio signals results in low false rejection and false acceptance rates.

Example 31 is an apparatus, for oversampling audio signals. The apparatus includes one or more microphones to receive audio signals; an extractor to extract a set of feature points from the audio signals; a means to determine a distance between each pair of feature points; and a means to generate a plurality of new feature points based the distance between each pair of feature points.

Example 32 includes the apparatus of example 31, including or excluding optional features. In this example, a plurality of feature vectors are created using the set of feature points and the new feature points. Optionally, the plurality of feature vectors are determined to be valid according to voice activity detection.

Example 33 includes the apparatus of any one of examples 31 to 32, including or excluding optional features. In this example, the generation of a plurality of new feature points generates new feature points that number at least 50% of the a number of feature points in the set of feature points.

Example 34 includes the apparatus of any one of examples 31 to 33, including or excluding optional features. In this example, the distance between the feature points is a Euclidean distance.

Example 35 includes the apparatus of any one of examples 31 to 34, including or excluding optional features. In this example, the means to generate the plurality of new feature points is to generate a plurality of new feature points based the distance between each pair of feature points, wherein each pair of feature points are valid feature points according to voice activity detection.

Example 36 includes the apparatus of any one of examples 31 to 35, including or excluding optional features. In this example, the means to generate the plurality of new feature points is a pre-processing function of a voice biometric system.

Example 37 includes the apparatus of any one of examples 31 to 36, including or excluding optional features. In this example, a speaker voice model is based on the set of feature points and the new feature points.

Example 38 includes the apparatus of any one of examples 31 to 37, including or excluding optional features. In this example, an authentication decision is based on the set of feature points and the new feature points.

Example 39 includes the apparatus of any one of examples 31 to 38, including or excluding optional features. In this example, the means to generate the plurality of new feature points results in low false rejection and false acceptance rates.

Example 40 includes the apparatus of any one of examples 31 to 39, including or excluding optional features. In this example, an utterance length for audio signal capture is directly proportional to the set of feature points plus the new feature points.

Example 41 is a computer-readable medium. The computer-readable medium includes instructions that direct the processor to capturing audio signals from an utterance; extracting a set of feature points from the audio signals; determining a distance between each pair of feature points; and generating a plurality of new feature points based on the distance between each pair of feature points of the set of feature points.

Example 42 includes the computer-readable medium of example 41, including or excluding optional features. In this example, the utterance is a phrase independent utterance.

Example 43 includes the computer-readable medium of any one of examples 41 to 42, including or excluding optional features. In this example, the utterance is a phrase dependent utterance.

Example 44 includes the computer-readable medium of any one of examples 41 to 43, including or excluding optional features. In this example, the set of feature points and the new feature points are used to train a speaker model.

Example 45 includes the computer-readable medium of any one of examples 41 to 44, including or excluding optional features. In this example, the set of feature points and the new feature points are used to for recognition decisions.

Example 46 includes the computer-readable medium of any one of examples 41 to 45, including or excluding optional features. In this example, an utterance length for audio signal capture is directly proportional to the set of feature points plus the new feature points.

Example 47 includes the computer-readable medium of any one of examples 41 to 46, including or excluding optional features. In this example, the feature points are Mel-frequency cepstral coefficients (MFCC).

Example 48 includes the computer-readable medium of any one of examples 41 to 47, including or excluding optional features. In this example, the feature points used for extrapolation are determined by a proximity search, similarity search, a closest point search, or any combination thereof.

Example 49 includes the computer-readable medium of any one of examples 41 to 48, including or excluding optional features. In this example, the generation of the plurality of new feature points is based the distance between each pair of feature points, wherein each pair of feature points are valid feature points according to voice activity detection Example 50 includes the computer-readable medium of any one of examples 41 to 49, including or excluding optional features. In this example, the oversampling results in low false rejection and false acceptance rates.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus, for oversampling audio signals comprising:
   one or more microphones to receive audio signals;
   an extractor to extract a set of feature points from the audio signals;
   a processing unit to determine a distance between each pair of feature points of the set of feature points; and
   an oversampling unit to generate a plurality of new feature points based on the distance between each pair of feature points and to generate a speaker voice model wherein the generation of the plurality of new feature points generates new feature points that number at least 50% of a number of feature points in the set of feature points.

2. The apparatus of claim 1, wherein a plurality of feature vectors are created using the set of feature points and the plurality of new feature points.

3. The apparatus of claim 2, wherein the plurality of feature vectors are determined to be valid according to voice activity detection.

4. The apparatus of claim 1, wherein the distance between each pair of feature points is a Euclidean distance.

5. The apparatus of claim 1, wherein the oversampling unit is to generate the plurality of new feature points based the distance between each pair of feature points, wherein each pair of feature points are valid feature points according to voice activity detection.

6. The apparatus of claim 1, wherein the oversampling is a pre-processing function of a voice biometric system.

7. The apparatus of claim 1, wherein the speaker voice model is based on the set of feature points and the plurality of new feature points.

8. The apparatus of claim 1, wherein an authentication decision is based on the set of feature points and the plurality of new feature points.

9. The apparatus of claim 1, wherein the oversampling results in low false rejection and false acceptance rates.

10. The apparatus of claim 1, wherein an utterance length for audio signal capture is directly proportional to the set of feature points plus the plurality of new feature points.

11. An method for oversampling audio signals, comprising:
   capturing audio signals from an utterance;
   extracting a set of feature points from the audio signals;
   determining a distance between each pair of feature points of the set of feature points;
   generating a plurality of new feature points based on the distance between each pair of feature points of the set of feature wherein the generation of the plurality of new feature points generates new feature points that number at least 50% of a number of feature points in the set of feature points; and
   identifying a user via recognition decisions based on the plurality of new feature points and the set of feature points.

12. The method of claim 11, wherein the utterance is a phrase independent utterance.

13. The method of claim 11, wherein the utterance is a phrase dependent utterance.

14. The method of claim 11, wherein the set of feature points and the plurality of new feature points are used to train a speaker model.

15. The method of claim 11, wherein an utterance length for audio signal capture is directly proportional to the set of feature points plus the plurality of new feature points.

16. The method of claim 11, wherein the plurality of new feature points and the set of feature points are Mel-frequency cepstral coefficients (MFCC).

17. A system for oversampling audio signals comprising, comprising:
   a microphone;
   a memory that is to store instructions and that is communicatively coupled to the microphone; and
   a processor communicatively coupled to the microphone and the memory,
      wherein when the processor is to execute the instructions, the processor is to:
      receive audio signals from an utterance;
      extract a set of feature points from the audio signals;
      determine a distance between each pair of feature points of the set of feature points
      generating a plurality of new feature points based on the distance between each pair of feature points of the set of feature points, wherein the generation of the plurality of new feature points generates new feature points that number at least 50% of a number of feature points in the set of feature points;

extrapolate a plurality of feature vectors based on the plurality of new feature points and the set of feature points; and identify a user via recognition decisions based on the plurality of new feature points, the set of feature points, and the plurality of feature vectors.

18. The system of claim 17, wherein the processor is to build a speaker voice model based on the plurality of new feature points and the set of feature points.

19. The system of claim 17, wherein the plurality of new feature points and the set of feature points are Mel-frequency cepstral coefficients (MFCC), linear predictive cepstral coefficients (LPCCs), line spectral frequencies (LSFs), and perceptual linear prediction (PLP) coefficients, or any combination thereof.

20. The system of claim 17, wherein the plurality of feature vectors are determined to be valid according to voice activity detection.

21. A non-transitory computer-readable medium, comprising instructions that, when executed by a processor, direct the processor to capture audio signals from an utterance;

extract a set of feature points from the audio signals;

determine a distance between each pair of feature points of the set of feature points;

generate a plurality of new feature points based on the distance between each pair of feature points of the set of feature points, wherein the generation of the plurality of new feature points generates new feature points that number at least 50% of a number of feature points in the set of feature points; and identify a user via recognition decisions based on the plurality of new feature points and the set of feature points.

22. The non-transitory computer-readable medium of claim 21, wherein the utterance is a phrase independent utterance.

23. The non-transitory computer-readable medium of claim 21, wherein the utterance is a phrase dependent utterance.

* * * * *